Aug. 18, 1925.
R. R. MILLER
1,550,382
CONVERTER ATTACHMENT FOR DRIVE WHEELS
Filed May 26, 1921    4 Sheets-Sheet 2
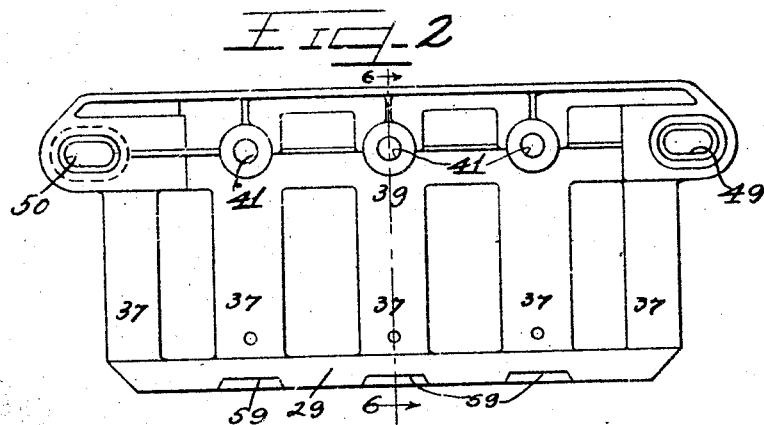
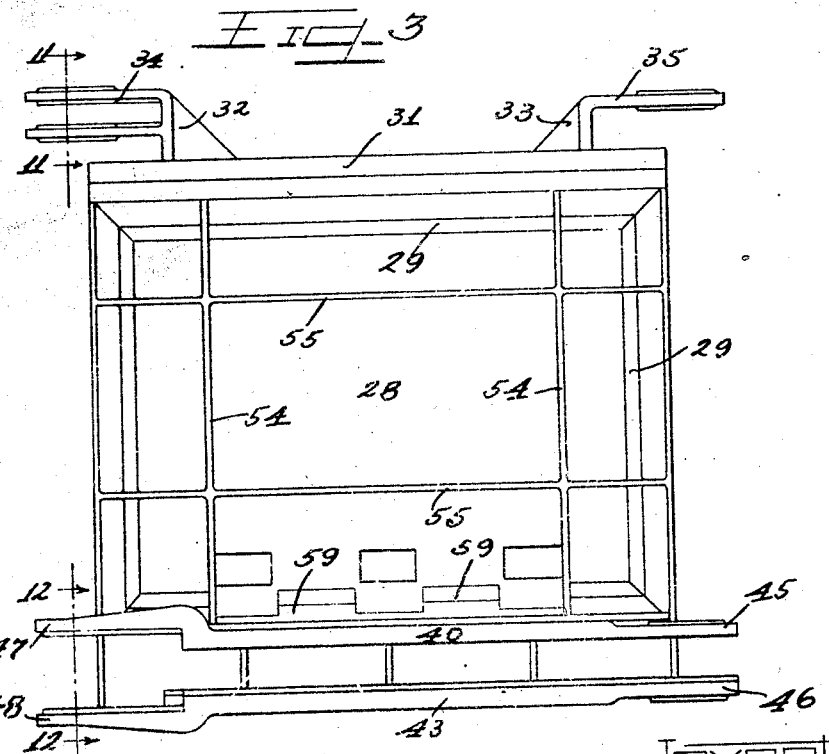
Inventor
ROYAL R. MILLER Aug. 18, 1925.
R. R. MILLER
1,550,382
CONVERTER ATTACHMENT FOR DRIVE WHEELS
Filed May 26, 1921 4 Sheets-Sheet 3
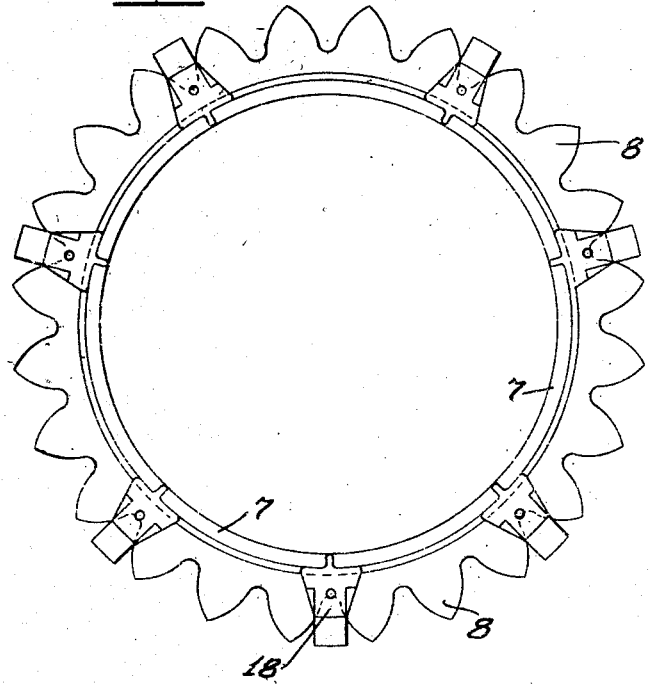
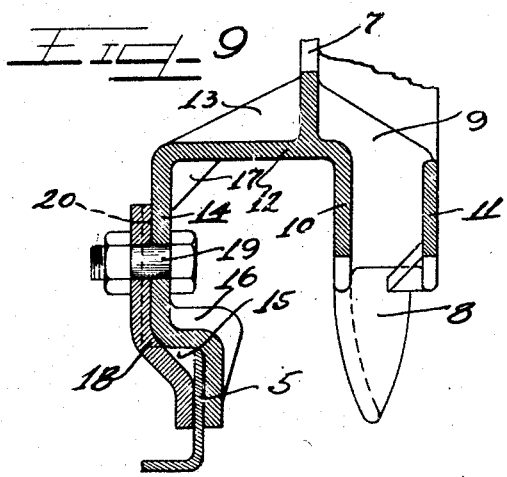
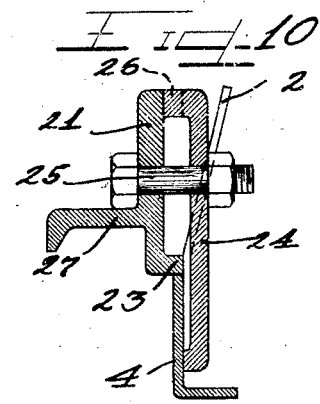
INVENTOR
ROYAL R. MILLER Aug. 18, 1925.
R. R. MILLER
1,550,382
CONVERTER ATTACHMENT FOR DRIVE WHEELS
Filed May 26, 1921 4 Sheets-Sheet 4
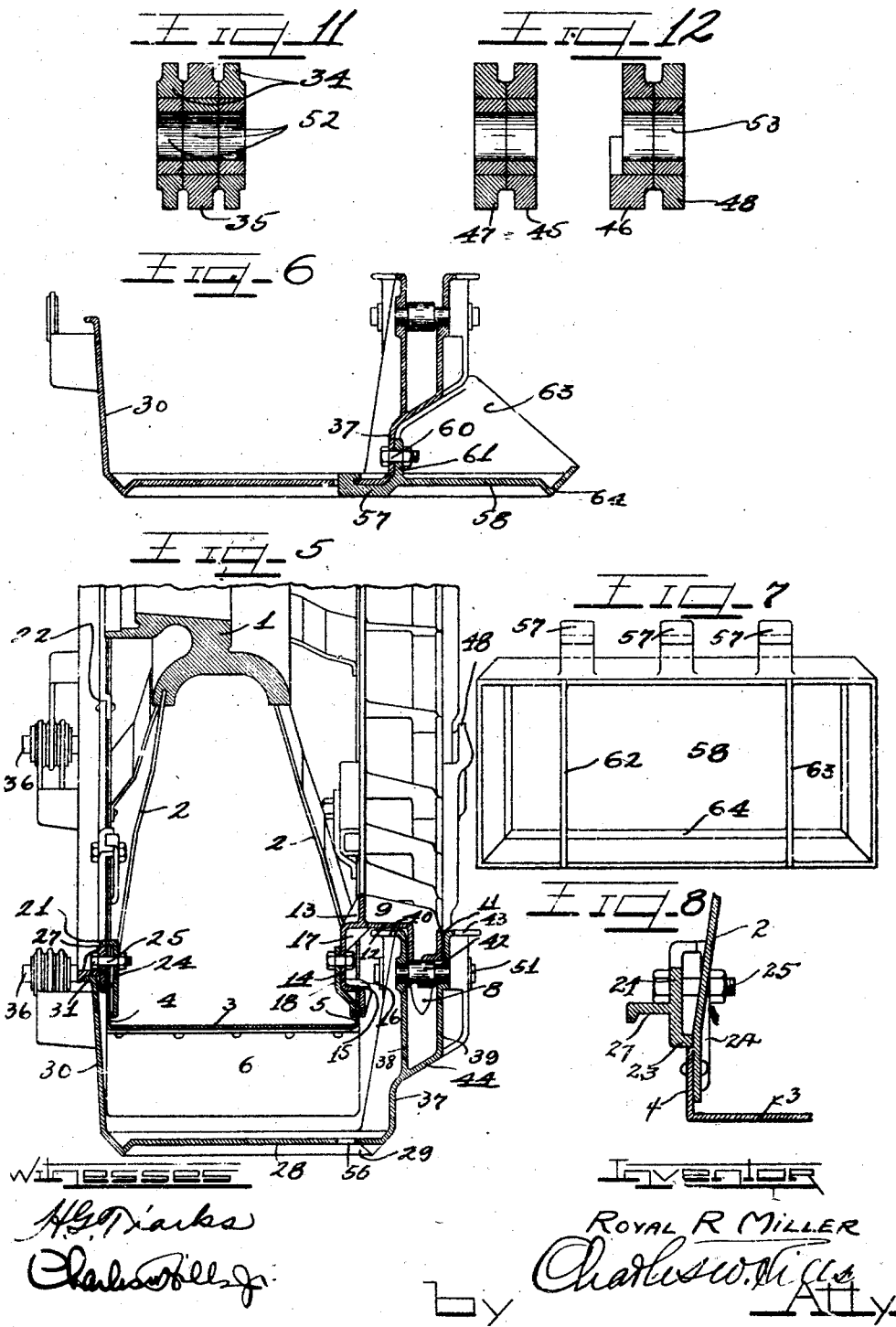

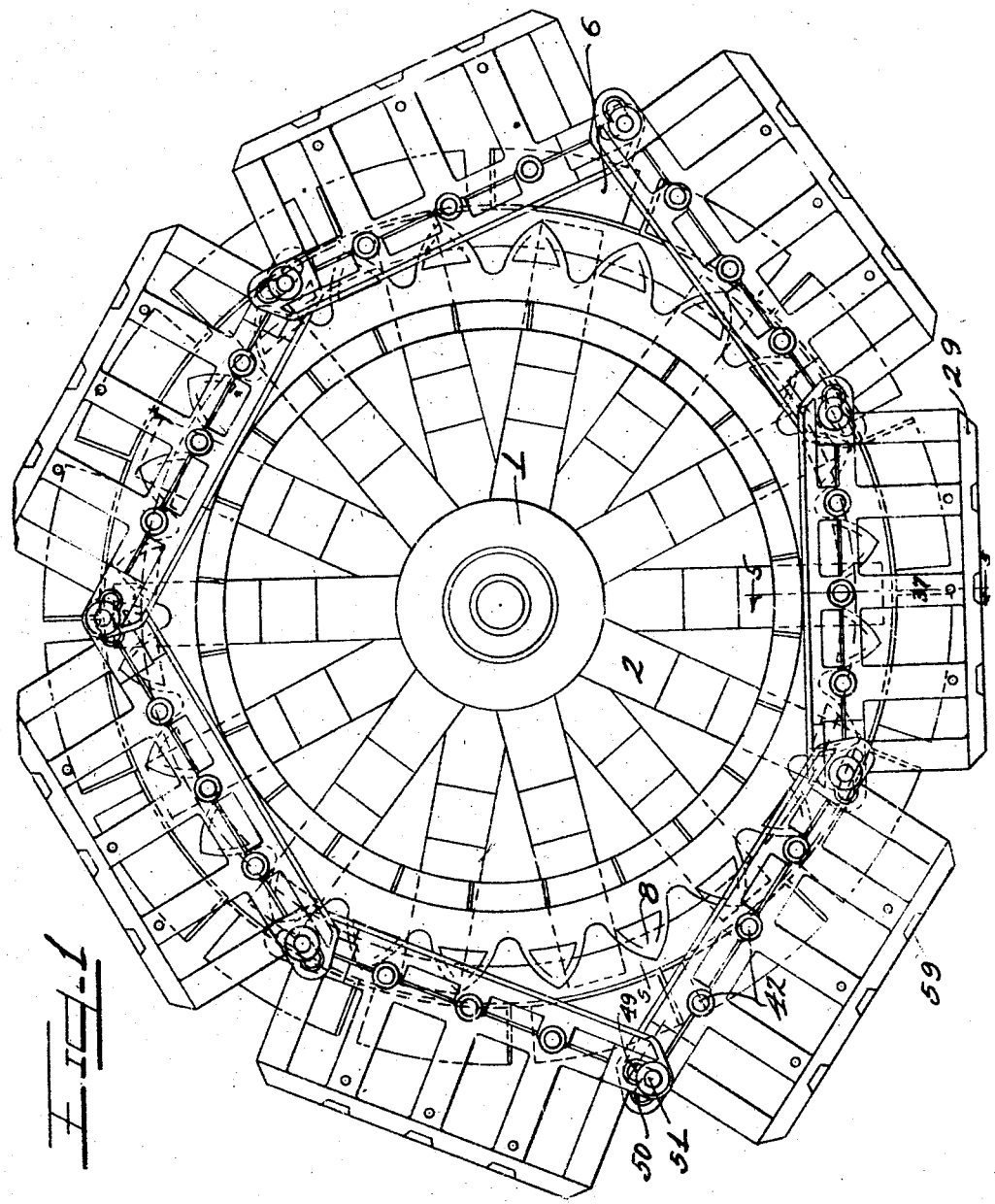

Patented Aug. 18, 1925.

1,550,382

UNITED STATES PATENT OFFICE.

ROYAL R. MILLER, OF CHICAGO, ILLINOIS, ASSIGNOR TO MILLER TRACTION TREAD COMPANY, A CORPORATION OF DELAWARE.

CONVERTER ATTACHMENT FOR DRIVE WHEELS.

Application filed May 26, 1921. Serial No. 472,837.

*To all whom it may concern:*

Be it known that I, ROYAL R. MILLER, a citizen of the United States, and a resident of the city of Chicago, in the county of Cook and State of Illinois, have invented certain new and useful Improvements in a Converter Attachment for Drive Wheels; and I do hereby declare that the following is a full, clear, and exact description of the same, reference being had to the accompanying drawings, and to the numerals of reference marked thereon, which form a part of this specification.

This invention relates to a converter attachment for drive wheels and particularly to a mechanism which is adapted to be used to convert tractor drive wheels into track-laying tread type drive wheels.

Tractors and similar vehicles which are provided with the ordinary annular drive wheels work well on hard ground and under favorable conditions but cannot be made to operate successfully under adverse conditions such as in muddy or soft ground. It is therefore desirable that an arrangement be provided whereby said drive wheels can be conveniently converted into track-laying tread type drive wheels for operation under such conditions. In effecting this conversion it is, of couse, desirable that the original drive wheels be altered as little as possible and that the track-laying treads be readily detachable therefrom.

It is an object of the present invention to provide a track-laying tread attachment which will operate in conjunction with an ordinary drive wheel without removing the traction cleats from said drive wheel.

It is another object of this invention to provide a track-laying tread attachment for drive wheels which is supported on and driven by means which are connected to the drive wheels in such a manner as not to interfere with the normal operation thereof.

It is also an object of this invention to provide a track-laying tread attachment for drive wheels which is maintained in true rolling relation with annular supporting means attached to each side of the drive wheels.

It is an important object of this invention to provide a track-laying tread attachment which may be readily attached to ordinary tractor drive wheels without altering the construction thereof.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a tractor drive wheel equipped with the improved track-laying tread attachment of this invention.

Figure 2 is a side elevation of one of the tread elements.

Figure 3 is an inside plan view of one of the tread elements.

Figure 4 is a rear elevation of the detachable driving gear.

Figure 5 is an enlarged fragmentary section on the line 5—5 of Figure 1.

Figure 6 is a section similar to Figure 5 with parts omitted and showing the tread extension secured to the tread element.

Figure 7 is an inside plan view of the tread extension.

Figure 8 is a fragmentary detail section showing the inside supporting structure for the tread.

Figure 9 is an enlarged fragmentary detail section showing the method of attaching the driving gear.

Figure 10 is an enlarged fragmentary detail section taken along the same line as Figure 5 showing the attachment of the inner supporting rim.

Figure 11 is an enlarged section on the line 11—11 of Figure 3 showing the connecting means of an adjacent tread member in position.

Figure 12 is a similar section on the line 12—12 of Figure 3.

As shown on the drawings:

The track-laying tread mechanism of this invention is particularly adapted to be used with tractor drive wheels and is shown herein in connection with a tractor drive wheel which comprises a hub 1 which has separated rows of spokes 2 extending radially therefrom. Said spokes 2 are connected to an annular rim 3 which is provided on its outer edges with integral vertical flanges 4 and 5 and which has secured to its outer surface by means of riveting or in any suitable manner a plurality of spaced traction cleats 6 of usual construction.

Means which are provided for supporting the track-laying tread elements on the drive wheel and driving the same therefrom will now be described. The main driving gear comprises an annular rim 7 on which is supported a plurality of integral teeth 8 which are of open formation to permit dirt and other foreign matter to readily fall therethrough and which are braced by ribs 9 and by integral annular flanges 10 and 11. Integral with the rim 7 and extending inwardly therefrom are horizontal members 12 which are rigidly braced by integral ribs 13 and which provide a surface on which the tread elements may be advanced. Extending downwardly from the inner edge of the members 12 are integral vertical flanges 14 which are outwardly offset to form annular shoulders 15, as clearly shown in Figures 5 and 9. Said shoulders 15 and the members 12 are reinforced as shown by integral ribs 16 and 17 respectively. Said shoulders 15 rest on the top of the vertical flange 5 of the rim 3 and the flanges 14 are securely clamped to said flange 5 by means of a plurality of brackets 18, the lower portions of which engage the inner surface of said flange and the upper portions of which are securely bolted to the members 12 by means of bolts 19, said brackets 18 being held in properly aligned position by means of shrouds or projections 20 which are shown in dotted lines in Figure 9.

Supporting means for the tread elements are also secured to the inner side of the drive wheel and comprise a separable annulus 21, the sections of which are bolted or otherwise secured together at joints 22. Said annulus 21 is made in sectional form in order that it may be secured in position on the rear or inside of the drive wheel without removing the same.

Formed on the outer edge of the annulus 21 is a lateral flange 23 which rests on the top of the flange 4 and the edge of which abuts the outer face of the spokes 2. Said annulus 21 is secured to the flange 4 and the spokes 2 by means of a plurality of clamping plates or brackets 24 which are firmly secured to said annulus by means of bolts 25, the upper ends of said brackets 24 being engaged between projections 26 on the face of the annulus 25, and the lower ends thereof being drawn tightly against the inner face of the flange 4.

Extending inwardly away from the wheel 1 directly outside the bolts 25 is a horizontal flange 27 which is integral with the annulus 21 and which affords a rolling surface on which the tread members are supported.

The tread elements which are driven by the gear teeth 8 and which are supported on the members 12 and on the flange 27 will now be described. Each of said tread members comprises a ground engaging plate 28 which has a rib 29 formed around its outer edge and which has a plurality of integral members 30 extending inwardly therefrom and terminating in a flange 31 which is adapted to engage the flange 27 on the annulus 21. Brackets 32 and 33 which are integral with said members 30 act to support interfitting slotted members 34 and 35 respectively which interengage similar members on adjacent tread members and have suitable pins 36 engaged through the elongated slots therein whereby the inner sides of the tread members are connected together with a lost motion connection and thus the flanges 31 thereon are maintained in true rolling relation with the flange 27 on the annulus 21. Extending inwardly from the other side of the plate 28 are a plurality of integral members 37 which act to support spaced members 38 and 29 between which the gear teeth 8 are adapted to be engaged, the members 12 on the rim 7 engaging a flange 40 integral with the inner edge of the member 38. Said members 37 and 38 are provided with a plurality of apertures 41 which are oppositely positioned and which are adapted to support rollers 42 journalled therein. Said rollers 42 are adapted to be engaged between the teeth 8 so that a rotation of the drive wheel and of said teeth acts to cause a consequent advancement of the tread elements or tread members. The members 39 are provided on their upper edge with a flange 43 and the lower portions of the members 38 and 39 are connected by angularly positioned integral portions 44, as clearly shown in Figs. 5 and 6. Extensions 45 and 46 are provided on one end of the flanges 40 and 43 respectively, and on the other end thereof extensions 47 and 48 are provided which are spaced sufficiently far apart to engage over the outside of the extensions 45 and 46 of an adjacent tread member. Said members 45 and 46, and 47 and 48, are provided with oppositely positioned elongated slots 49 and 50 and after the members are engaged in interfitting relation with the corresponding members on an adjacent tread member, connecting pins 51 are engaged through the slots in the members and act to connect the same with a lost motion connection thereby allowing the tread members to be properly driven by the gear teeth 8 and at the same time to be maintained in a true rolling relation with the members 12. In order that the wear at the connecting portions 34 and 35 may be reduced to a minimum and in order that the worn parts may be replaced, the slots in said portions are preferably provided with hardened bushings 52 and for the same reason the slots in the portions 45 and 46, and 47 and 48 are also provided with hardened bushings 53. Integral ribs 54 and 55 which are formed on the inside of the tread members serve to brace the same both laterally and longitudinally.

When the drive wheels are traveling over very soft ground it is sometimes desirable that the area of the tread surfaces be increased and for this purpose tread extensions are provided which may be removably secured to the tread elements in a manner which will now be described. A plurality of rectangular openings 56 are provided in the plates 28 and are adapted to be engaged by hooks 57 which are integral with a ground engaging plate 58 of the tread extension. Said hooks 57 extend through cutaway portions 59 in the rib 29 and, together with the ground engaging plate 58, are securely connected to the tread members by means of bolts 60 engaged through the members 37 and through an integral vertical flange 61 on the plate 58. Said tread extensions are provided with ribs 62 and 63 which are formed at the proper angle to engage tightly under the connecting portions 44 on the tread members. Said tread extensions are also provided with a rim 64 similar to the rim 29 around their outer edges.

The operation is as follows:

The track-laying tread attachment of this invention is adapted to be conveniently attached to the drive wheels of any automotive vehicle and is particularly applicable to tractor drive wheels. The annulus 7 is secured to the outside of the drive wheels by being clamped to the flange 5 and said annulus, together with its integral members 12 and the gear teeth 8, affords a supporting and driving means for the tread members. An inner supporting means for the tread members is supported by the annulus 21 which is clamped to the spokes 2 and which rests on the flange 4 and since said annulus is formed in sections which are bolted or otherwise secured together at joints 22, it is not necessary to remove the drive wheel in order to place said annulus in position.

The lost motion connection between the tread members which is afforded by the engagement of the pins 36 and 51 in the elongated slots in the connecting means for said tread members allows the tread members to be driven by the gear teeth 8 and at the same time to be maintained in true rolling relation with the members 12 and with the flange 27. In this connection, it may be noted that the flange 27 is substantially in the same plane as the pitch line of the gear teeth 8 and consequently a very efficient drive of the tread members is attained. The members 30, 37, 38 and 39 are of sufficient length to allow the tread members to move freely over the traction cleats 6 and consequently the necessity for removing said traction cleats when the wheel is converted into a track-laying tread type drive wheel is obviated. This construction also makes possible the conversion of drive wheels which are provided with hard rubber tires, as is often done with various types of light tractors. In view of the fact that the driving and supporting means on both sides of the drive wheel are inside the plane of the periphery thereof, it is not necessary to remove the same when the tread elements are removed since they do not in any way interfere with the normal operation of the drive wheel. After these driving and supporting means are secured to the drive wheel it is only necessary to lay the tread elements on the ground in the proper relative position, connect the adjacent tread elements together, and drive the vehicle over the same when the tread elements may be engaged over the driving gear teeth and around the drive wheels, the end tread elements being subsequently connected together by means of the connecting pins 51 and 36.

It will be apparent from the foregoing that this invention provides a convenient means for converting ordinary drive wheels into an efficient type of track-laying tread drive wheels without altering the construction thereof, and it will also be apparent that this conversion may be quickly and conveniently effected and that the wheel may be quickly reconverted for use as an ordinary round drive wheel.

I am aware that numerous details of construction may be varied through a wide range without departing from the principles of this invention, and I therefore do not purpose limiting the patent granted otherwise than necessitated by the prior art.

I claim as my invention:

1. The combination with a drive wheel, of traction cleats thereon, supporting means removably attached to each side of the wheel, and connected tread elements engaging said supporting means and enclosing the traction cleats.

2. The combination with a drive wheel having outwardly extending traction cleats thereon, of inwardly extending flanges on each side thereof, a driving annulus secured to one flange, a supporting annulus having a flat bearing surface secured to the other flange, and connected tread members engaging said annuli and movable over the traction cleats.

3. The combination with a drive wheel, of inwardly extending flanges thereon, spokes extending from the hub of the wheel to the inside of the flanges, a driving annulus secured to one flange, a supporting annulus secured to the other flange and abutting the spokes, and connected tread members engaging said annuli.

4. The combination with a drive wheel, of traction cleats thereon, supporting and driving means removably secured to the drive wheel inside the plane of the periphery thereof, and connected track-laying tread members engaging said supporting and driving means and enclosing the traction cleats.

5. The combination with a drive wheel, of traction cleats thereon, a track-laying tread mechanism engaged over said traction cleats, and means associated with the side of the drive wheel for driving said track-laying tread mechanism and supporting the same from contact with said traction cleats.

In testimony whereof I have hereunto subscribed my name.

ROYAL R. MILLER.